US011646679B2

(12) United States Patent
Choi et al.

(10) Patent No.: US 11,646,679 B2
(45) **Date of Patent: *May 9, 2023**

(54) HIGH PERFORMANCE ELECTRIC GENERATORS BOOSTED BY NUCLEAR ELECTRON AVALANCHE (NEA)

(71) Applicant: UNITED STATES OF AMERICA AS REPRESENTED BY THE ADMINISTRATOR OF NASA, Washington, DC (US)

(72) Inventors: Sang H. Choi, Poquoson, VA (US); Dennis M. Bushnell, Hampton, VA (US); Adam J. Duzik, Rockledge, FL (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 73 days.

This patent is subject to a terminal disclaimer.

(21) Appl. No.: 17/235,497

(22) Filed: Apr. 20, 2021

(65) Prior Publication Data

US 2021/0242810 A1 Aug. 5, 2021

Related U.S. Application Data

(63) Continuation of application No. 16/354,701, filed on Mar. 15, 2019, now Pat. No. 10,985,676.

(60) Provisional application No. 62/643,303, filed on Mar. 15, 2018.

(51) Int. Cl.
*H02N 3/00* (2006.01)
*G21H 1/04* (2006.01)
*G21H 1/12* (2006.01)

(52) U.S. Cl.
CPC ................ *H02N 3/00* (2013.01); *G21H 1/04* (2013.01); *G21H 1/12* (2013.01)

(58) Field of Classification Search
CPC ............... H02N 3/00; G21H 1/04; G21H 1/12
USPC ........................................................ 310/305
See application file for complete search history.

(56) References Cited

U.S. PATENT DOCUMENTS 10,985,676 B2 * 4/2021 Choi ..................... H02K 99/00

* cited by examiner

*Primary Examiner* — Terrance L Kenerly
(74) *Attorney, Agent, or Firm* — Shawn P. Gorman; Robin W. Edwards; Trenton J. Roche

(57) ABSTRACT

Various aspects include electric generators configured to boost electrical output by leveraging electron avalanche generated by a high energy photon radiation source. In various aspects, an electric generator includes a stator and a rotor positioned within the stator, wherein the stator and rotor are configured to generate electric current when the rotor is rotated, and a high energy photon source (e.g., a gamma ray source) positioned and configured to irradiate at least a portion of conductors in the rotor or stator. In some aspects, the stator generates a magnetic field when the electric generator is operating, and the rotor includes armature windings configured to generate electric current when the rotor is rotated. In some aspects, the high energy photon source includes cobalt-60 and/or cesium-137.

9 Claims, 7 Drawing Sheets

100 108c 103 108a 102 107 VISIBLE~VUV PHOTONS γ-RAY PHOTONS 108c 108b 108c 108b 108c 108b 105 X-RAY PHOTONS 108b 108c 104 108b 108c 109 LIBERATED ELECTRONS BY γ-RAY: X-RAY: Vis~VUV:

HIGH PERFORMANCE ELECTRIC GENERATORS BOOSTED BY NUCLEAR ELECTRON AVALANCHE (NEA)

CROSS-REFERENCE TO RELATED PATENT APPLICATIONS

This application is a continuation of and claims the benefit of priority to U.S. patent application Ser. No. 16/354,701, titled "High Performance Electric Generators Boosted by Nuclear Electron Avalanche (NEA)" filed on Mar. 15, 2019, which claims the benefit of priority to U.S. Provisional Application No. 62/643,303, titled "High Performance Electric Generators Boosted by Nuclear Electron Avalanche (NEA)", filed Mar. 15, 2018, the entire contents of which are incorporated herein by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD

Aspects of the present disclosure are related to electric generators, and more particularly to electric generators boosted by electron avalanche.

BACKGROUND

Inside conventional electric generators, conductors (i.e., wires) in the rotor coils crossing the magnetic field have mobile electrons. The maximum available number of mobile electrons per atom are intrinsically the same as the number of electrons in the outer-most (valence) shell of an atom. Therefore, the conventional electric generators use the maximum level of mobile electrons per atom for power generation ($\vec{J}=\vec{F}\times\vec{H}$).

Since conventional generators use free electrons mostly out of or staying on the valence (or the outer-most) shell of atom for power generation, enhancement of power output is related only to magnetic field strength and design considerations such as number of coil turns and the rotational speed and force of the rotor.

SUMMARY

Various aspects include electric generators configured to boost electrical output by leveraging electron avalanche generated by a high energy photon radiation source. In various aspects, an electric generator includes a stator and a rotor positioned within the stator, wherein the stator and rotor are configured to generate electric current when the rotor is rotated, and a high energy photon source (e.g., a gamma ray source) positioned and configured to irradiate at least a portion of conductors in the rotor or stator. In some aspects, the stator generates a magnetic field when the electric generator is operating, and the rotor includes armature windings configured to generate electric current when the rotor is rotated. In some aspects, the high energy photon source includes cobalt-60 and/or cesium-137.

In some aspects, the high energy photon source is positioned within the rotor and configured to irradiate at least the armature windings. In some aspects, the high energy photon source is configured as a sleeve that fits within the rotor inside of the armature windings.

In some aspects, the high energy photon source is positioned between the rotor and the stator and configured to irradiate the armature windings. In some aspects, the high energy photon source is configured as a sleeve that fits between the rotor and the stator.

In some aspects, the stator includes field and compensating windings, and the high energy photon source is positioned and configured to irradiate the field and compensating windings.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
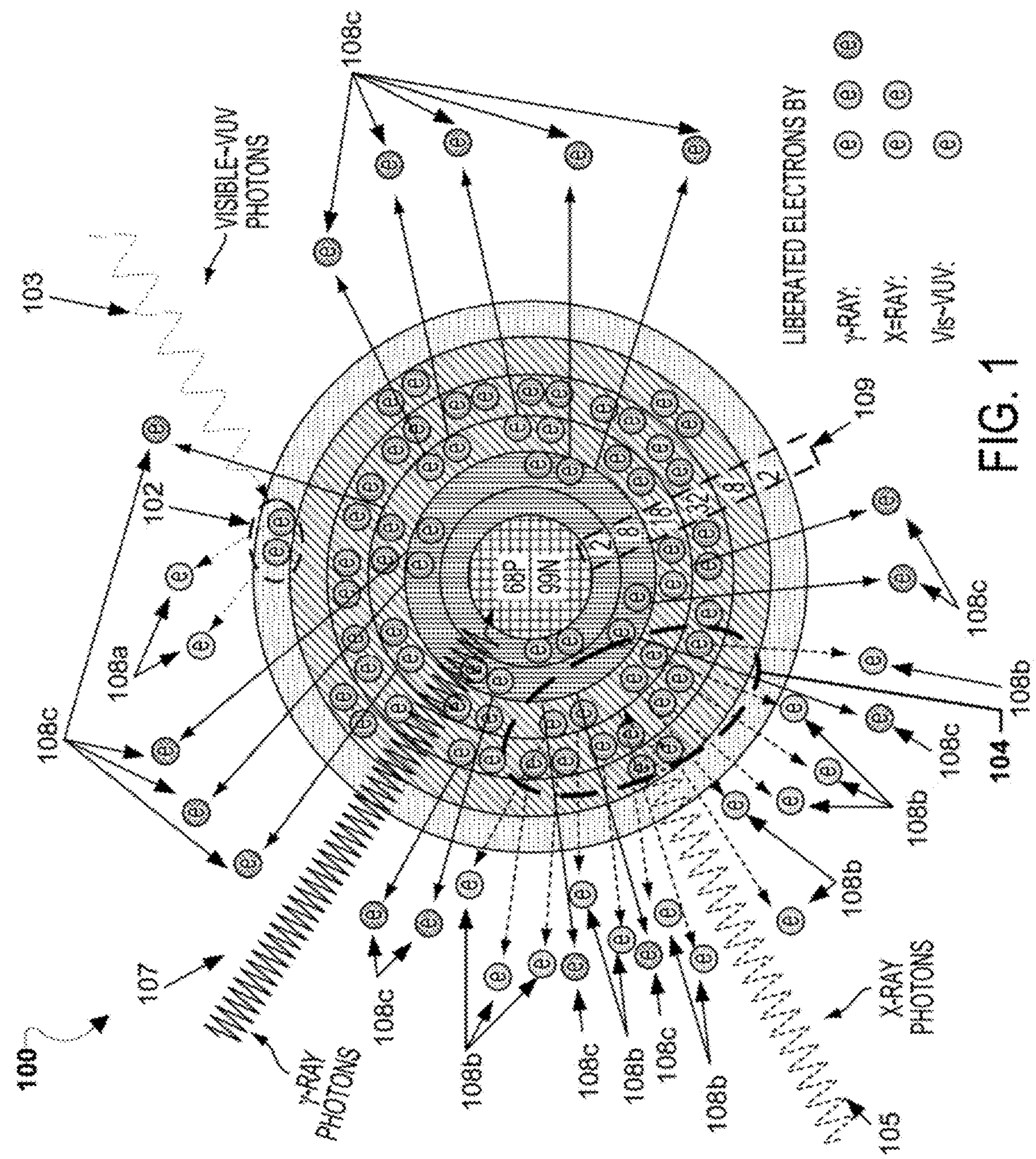
FIG. 1 is a notional diagram of electron avalanche processes caused by visible/ultraviolet light, X-ray and gamma ray (γ-ray) photons.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will also be understood that, as used herein, the terms "the," "a," or "an," mean "at least one," and should not be limited to "only one" unless explicitly indicated to the contrary.

Conventional electric generators generate electrical current by rotating a rotor having several coils of conductors (e.g., copper wires) through a magnetic field generated by a stator. Conduction electrons (i.e., electrons in the valence shell of conductor atoms) are motivated by the motion through the magnetic field to move through the conductors by interactions with the magnetic field according to the well know law of $\vec{J}=\vec{F}\times\vec{H}$, where $\vec{J}$ is the electric current vector, $\vec{F}$ is the force vector due to motion of the conductors, and $\vec{H}$ is the magnetic field vector. The maximum available number of mobile (or conduction) electrons per atom are intrinsically the same as the number of electrons in the valence (or the outer-most occupied) shell of the conductor atoms (e.g., two electrons in copper). Conventional electric generators use these mobile electrons for power generation. Current electric generators are built with several different designs to increase power output by increasing the number of coils intersecting the magnetic field. However, optimized designs do not alter the physics of the generator, but only optimize field generation and coil windings. As a result, the power output of conventional electric generators is related only to magnetic field strength and design considerations, such as number of coil turns and the rotational speed and force of the rotor.

Ordinarily, electric generators use free electrons in the outer-most occupied (valence) shell of the atoms in the conducting wire. The number of free electrons available for power generation is 2 or 3 per atom for most conductors. For example, copper has 2 mobile electrons per atom in the conduction band. Electrons in normally unfilled atomic states have much more freedom for bound-to-free and free-to-free transitions. However, within the atomic structure, there are a lot more electrons in the inner (intra-band) atomic shells which require a lot more energy to release them to be free.

Various embodiments leverage the physics of ionizing radiation to produce additional mobile electrons from the intra-bands for more current generation, thereby boosting the electric current generated for a given number of coil turns and rotation speed and force of the rotor. By making intra-band electrons mobile and thus available for motivation through a power circuit driven by $\vec{J}=\vec{F}\times\vec{H}$, the increase in the number of available electrons increases power output for a given design and rotation rate. Liberating intra-band electrons requires a certain amount of energy, which in various embodiments is provided by gamma rays irradiating conductor atoms.

In conventional electric generators, electrons with available unfilled states of outer-most shell can be freely mobilized by the Lorenz force caused by moving a conductor through a magnetic field, mathematically represented by $\vec{F}\times\vec{H}$. If intra-band electrons are liberated from their bound states into conduction states through bound-to-free and free-to-free transitions, more mobile electrons can be made available for generating an electric current in this manner. The energy required to liberate electrons in intra-bands is in the range of several keV or higher. This amount of energy can be readily provided by high energy photons, such as X-ray or γ-rays. This form of radiation carries sufficient photon energy to penetrate through and liberate inner bound electrons within conductor atoms.

By increasing the number of mobile electrons in this manner, the power output of an electric generator can be enhanced by several times its original amount or even by orders of magnitude for a given rotor configuration (e.g., number of coils) and rotation speed and force. Increasing the power output of the electric generator in this manner will require increased mechanical force applied to the rotor to rotate, but the ability to generate more power from a given sized electric generator may have advantages, such as in applications in which the size and weight of the generator is constrained.

Due to their high energies, coupling interactions of γ-ray photons with atomic structure are violent, liberating electrons from the intra-bands and inducing unstable nuclear resonant modes. FIG. 1 is an illustration showing how electrons can be liberated through bound-to-free transition according to the incident photon energy. As illustrated, visible and ultraviolet (UV) light photons interact with outer-most unoccupied (or valence) shell electrons. X-ray photons can penetrate deeper into the atomic shell structure and interact with intra-band electrons causing such electrons to be ejected or transitioned to lower energy shells including the conduction band. γ-ray photons interact with intra-band electrons imparting greater energy to electrons that are ejected from the atom.

FIG. 1 shows a simple interaction model of visible through vacuum UV photons 103, X-ray photons 105, and γ-ray photons 107 with atomic electrons. The number of electrons in each shell is given in box 109. The visible through vacuum UV photon 103 carries just enough energy to release the outer-most shell (or valence band) electrons 102 from a bound state to a free state 108*a*. An X-ray photon 105 may be strong enough to penetrate into the inner-shells of atom and shake up and release intra-band electrons 104 from their bound states to a free state 108*b*. Extremely strong γ-ray photons 107 can even penetrate and shake up the nucleus 106 and make all electrons of the atom unstable enough to undergo a bound-to-free transition. After bombardment by gamma ray photons 107, the electrons in the inner-most shells almost instantaneously undergo a recombination process through a free-to-bound transition by releasing equivalent photon energy. This free-to-bound transition induces spontaneous photon emission with equivalent energy of the excited state. These emitted photons from the recombination process interact with and energizes those electrons which are already in unstable or free states, further releasing more electrons from the other outer shells of an atom 108*c*.

The interaction processes of intra-band electrons 104 within an atomic inter-shell structure described above are generally instantaneous and localized within the atomic structure 100. The frequency of interactions is heavily dependent upon the coupling cross-section of the intra-bands electrons 104 and the energy and flux density of the X-ray photons 105 or γ-ray photons 107. Unless the γ-ray photons 107 continuously bombard the atomic structure 100, the intra-band electrons 104 recoil and undergo an inter-band recombination process (free-to-bound) approximately within a zepto second ($zs \approx 10^{-21}$ sec) which is inversely proportional to the intra-band gap energy ($\tau \sim 1/E$). The intraband upper lifetime is extremely short due to the large scale of bound energy. However, because of the continuous interaction processes of original, or reemitted, X-ray photons 105 or γ-ray photons 107 with atomic electrons, the avalanche state of a huge number of free electrons 108*a-c* ($10^5$ C/cm$^3$) may be sustained for thermionic processes.

Absorption of a γ-ray photon in a material, such as a conductor atom typically results in a cascade or avalanche of liberated electrons through secondary and tertiary interactions. γ-ray photons interact with matter via four main processes: the photonuclear (pn) effect, the photoelectric (pe) effect, Compton scattering (C), and electron/positron pair production (pp). As a γ-ray photon penetrates matter, the energy deposited by absorption is proportional to the absorption cross-section ($\sigma_t = \sigma_C + \sigma_{pe} + \sigma_{pn} + \sigma_{pp}$) and the atomic weight of matter (Z), and the thickness of material through which the γ-ray photon is traveling.

The photonuclear effect (also called phototransmutation) is a nuclear process in which an atomic nucleus absorbs a high-energy gamma ray, enters an excited state, and immediately decays by emitting a subatomic particle. This phototransmutation can be sustained when the energy of impinging γ-ray photons exceeds the binding energy of nucleus. The incoming gamma ray effectively knocks one or more neutrons, protons, or an alpha particle out of the nucleus. Such transmutations may also result in the emission of γ-ray photons from the transmuted nucleus. Ejected protons, alpha particles and γ-ray photons will interact with conductor atoms to excite and eject electrons as those particles of radiation are themselves absorbed.

In the photo-electric effect, the energy of the interacting γ-ray photon is absorbed by an electron within one of the atomic shells, which ejects the electron from its atom and the photon effectively disappears after the interaction. A complete absorption of the γ-ray photon energy imparts significant energy to the electron, ejecting the electron (which may be referred to as a photo-electron) from the atom with high kinetic energy. After the ejection of the photo-electron the atom is ionized, but the vacancy in the bound shell is quickly refilled with an electron from the surrounding medium or from an upper atom shell. This may lead either to the emission of one or more characteristic fluorescence X-rays or to the ejection of an electron from one of the outer shells called an Auger electron. Fluorescence X-rays are absorbed in adjoining atoms via the photoelectric effect, Compton scattering or Rayleigh scattering. The ejected photo-electron interacts with other electrons in the same atom and adjoining atoms through scattering interactions, exciting and ejecting those electrons (referred to as secondary electrons), losing energy with interaction, until the photon-absorbing electron loses sufficient energy to be captured in an atom or joining the flow of electrons through the conductor. Electrons ejected by scattering interactions with the photo-electron (i.e., secondary electrons) are similarly slowed down through scattering interactions with other electrons, which can result in more ejected electrons (referred to as tertiary electrons). Thus, in the photo-electric effect the γ-ray photon's energy is absorbed by one electron, which then produces a large number of excited and ejected electrons as the imparted energy is absorbed in the conductor. Thus, absorption of a single γ-ray photon results in a cascade or avalanche of many energized and mobilized electrons within the absorbing material.

In Compton scattering, a γ-ray photon that is scattered (i.e., changes direction without being absorbed) by an electron. As a result, some of the γ-ray photon's energy is imparted to the electron as kinetic energy, which can eject the electron from the atom. The γ-ray photon continues on with reduced energy until it interacts with another electron via the photo-electric effect or Compton scattering. An electron ejected by Compton scattering will likewise slow down through scattering interactions with other electrons, thus liberating secondary and tertiary electrons.

In electron/positron pair production, a γ-ray photon with an energy exceeding 1.02 MeV interacting with the electric field of an atom's nucleus is converted to a positron and an electron (referred to as an electron-positron pair). These particles fly apart with combined kinetic energy equal to the excess of the γ-ray photon above 1.02 MeV, and are the absorbed through electron scattering (like photo-electrons), generating more secondary and tertiary mobile electrons. The positron is quickly annihilated by colliding with an electron, turning the positron and electron back into a 1.02 MeV γ-ray photon, which can then interact with matter through the photo-electric effect and Compton scattering. Thus, the electron/positron pair production interaction also produces a large number of excited and mobilized electrons.

Thus, the interaction of γ-ray photons with intra-band electrons through any or together with photoelectric, photonuclear, Compton scattering, and pair production processes deposits enough energy to liberate a large number of secondary and tertiary electrons. This generation of a large number of secondary and tertiary electrons in addition to the primary electrons is referred to herein as an avalanche process.

Primary, secondary and tertiary electrons ejected by the absorption of a γ-ray photon lose energy and undergo an inter-band recombination process (free-to-bound) approximately within a zepto second ($zs \approx 10^{-21}$ sec), a time that is inversely proportional to the intra-band gap energy ($\tau \sim 1/E$). The intra-band upper lifetime is extremely short.

Figure 2:
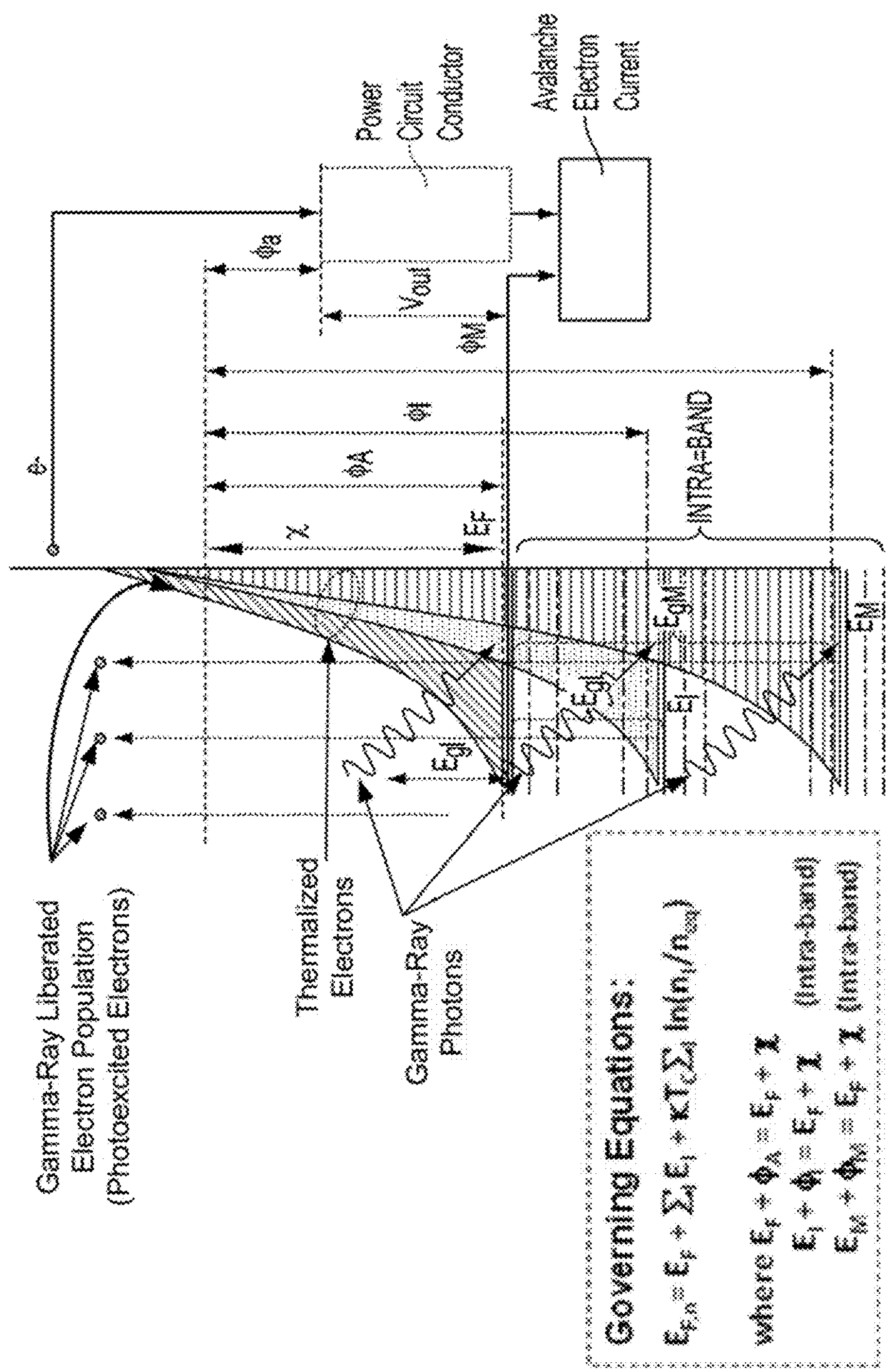
FIG. 2 is a diagram illustrating how photoexcitation and thermalization processes initiated by gamma-ray and beta particles from radioactive materials can increase the conduction band population, creating a large avalanche electron current.

FIG. 2 illustrates all of these processes of absorption of γ-ray photons by electrons resulting in free electrons ejected from various atomic shells, and the recombination of free electrons into unfilled shells in atoms.

In various embodiments, the coils of the electric generator rotor are exposed to a continuous flux of γ-ray photons, and therefore the combined interaction processes of γ-ray photons with atomic electrons described above are a continuous process, generating a huge number of free electrons as an avalanche state of electrons mimicking thermionic electrons. The ejected electrons in an avalanche state also interact with and thermalized by lower energy gamma photons resulting from Compton scattering and pair production. Such a thermalization process of electrons increases the kinetic energy of free electrons, which in turn slows down the recombination (free-to-bound) process shown in FIG. 2.

The radiation-enhanced thermalized avalanche electrons can be estimated by considering the flux of photo-excited and thermalized electrons that have sufficient energy to run randomly within the domain of a conductor. The flux of electrons is the collection of electrons freed up from the deep level and intra-band photo excitations by a MeV level γ-ray photon. The electron population in the conductor is distributed by the quasi-Fermi level in the aftermath of the level transitions from the deep and intra-bands impacted by high energy γ-ray photon fluxes. FIG. 2 illustrates the deep and intra-band level transitions. The electrons freed from the deep and intra-bands, $\Sigma E_i$, are simultaneously populated above the level of the conduction band minimum, $E_C$, and gain further energy through thermalization and photoexcitation processes. For the purposes of this estimation, in a conductor, $E_C \approx E_F$.

Using the non-degenerate conductor model, the Fermi energy of a number of electrons is expressed in equation (1) by:

$$E_{F,n} = E_F \Sigma_i E_i + \kappa T_C \Sigma_i \ln(n_i/n_{eq}) \tag{1}$$

In equation (1), $E_F$ is the Fermi level, $E_i$ is the Fermi level of intra-band, $n_i$ is the total freed-up electron concentration from an intra-band, $n_{eq}$ is the equilibrium concentration without photoexcitation, and $T_C$ is the conductor temperature. From the above expression, the γ-ray photoexcitation contribution is represented in $\Sigma E_i$, the where the electron concentration is multiplied through bound-to-free and freeto-free transitions within a conductor. The third term of Eq. (1) indicates the thermalized electrons in the free-to-free transition state.

Suppose that the freed-up electrons are populated within a conductor. The total current density can be estimated by equation 2.

$$J_C = \sum_i \left( \int_{E_C+X}^{\infty} e\, v_{ix} N(E_i) f(E_i) dE_i \right) = \sum_i \left[ \int_{E_C+X}^{\infty} e\, v_{ix} \left( \frac{4\pi(2m^*)^{\frac{3}{2}}}{h^3} \right) \sqrt{E_i - E_C} \cdot \exp\left( \frac{-E_i + E_{F,n}}{\kappa T_C} \right) dE_i \right] \tag{2}$$

In equation 2, $E_C \approx E_F$, $\chi$ is the electron affinity, e is the electron charge, $v_{ix}$ is the electron velocity within the conducting material, $N(E_i)$ is the density of i states, $f(E_i)$ is the Fermi distribution, m* is the effective mass, and i=F, I, M, . . . (i.e. intra-bands). The expression on the right hand side of equation (2a) assumes that the density of states is parabolic and approximates the Fermi function by the Boltzmann distribution because the work function is much larger than $\kappa T_C$.

$$J_C = \sum_i \left( \int_{E_C+X}^{\infty} e v_{ix} N(E_i) f(E_i) dE_i \right) = \sum_i \left[ \int_{E_C+X}^{\infty} e v_{ix} \left( \frac{4\pi(2m^*)^{\frac{3}{2}}}{h^3} \right) \sqrt{E_i - E_C} \cdot \exp\left( \frac{-E_i + E_C - E_C + E_{F,n}}{\kappa T_C} \right) dE_i \right] \tag{2a}$$

Suppose that the effective mass is isotropic. Then under both the thermalization and the photoexcitation processes of electrons, electrons gain degrees of freedom isotropically, such as $\Sigma E_i - E_C = \Sigma(m^* v_i^2/2)$, where $v_i^2 = v_{ix}^2 = v_{iy}^2 = v_{iz}^2$. The integral can be rewritten in terms of electron velocities as:

$$J_C = 2e\left(\frac{m^*}{h}\right)^3 \exp\left[\frac{-(E_C - E_{F,n})}{kT_C}\right] \cdot \sum_i \left\{ \int_0^{\infty} dv_{iy} \int_0^{\infty} dv_{iz} \int_0^{\infty} dv_{ix}\, v_{ix} \cdot \exp\left(\frac{m^* v_i^2}{2kT_C}\right) \right\} \tag{3}$$

The excitation and thermalization processes of electrons require substantial energy, more than the bandgap energy ($E_{gI}$ . . . $E_{gM}$) for deep level transitions. The incident γ-rays or high energy α and β particles (e.g., from photonuclear absorption) increase the electron population by both thermalization and photon-coupling above the conduction band minimum. These photo-excited and thermalized electron populations are effectively freed up to undergo a free-to-free transition away from band-gap structures ($E_g$, $E_{gI}$ . . . $E_{gM}$) of materials and exist in a conductor domain as free electrons. Therefore, the potential gap of electron population is further increased beyond the electron recombination.

The energies for level transitions can be expressed by the summation of bound-to-free ($E_C$) and free-to-free transitions (×), such as $E_C+\chi$ which is equal to $E_F+\phi_A$ for valence band, $E_I+\phi_I=E_C+\chi$ (Intra-band), and $E_M+\phi_M=E_C+\chi$ (Intra-band). Within the bandgap structures, $E_C$ can be expressed with the bandgap energy ($E_g$) on top of the Fermi energy at valence band and the Fermi energies ($E_{gI}$ . . . $E_{gM}$) for intra-bands. Since the conduction-band minimum ($E_C$) is within the free-to-free transition regime, $E_C \geq E_I+E_{gI}$ and $E_C \geq E_M+E_{gM}$ for the intra-bands. Therefore, the work functions ($\Sigma\phi_I$) of the system is determined by $\phi_I \geq E_{gI}+\chi$ and $\phi_M \geq E_{gM}+\chi$ for intra-bands. Equation (3) indicates the current density by the avalanche electrons within a conductor exposed under high energy γ-ray photons.

Figure 3:
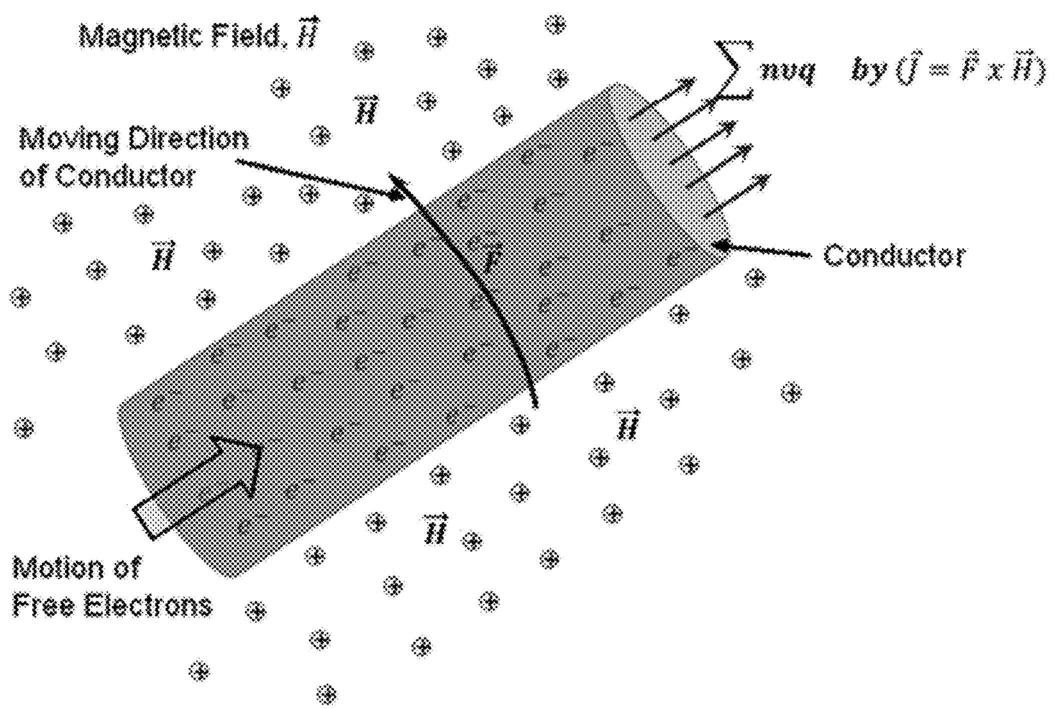
FIG. 3 is a diagram illustrating motion of electrons in a moving conductor in a magnetic field in a conventional electric generator.

In a conductor that is moving perpendicular to an oriented magnetic field, as in the coils of the rotor in an electric generator, the free electrons within conductor move in a direction determined by $\vec{F}\times\vec{H}$, as shown in FIG. 3.

In FIG. 3, n is the number of electrons available for freely moving in the conductor, u is the speed of electrons in the conductor, and q is the charge of electron. The total current is the summation of n electrons with the speed of υ times the charge of the electron. The current density within a moving ($\vec{F}$) conductor moving through the magnetic field ($\vec{H}$) is defined by $\vec{J}=\vec{F}\times\vec{H}$. Integrating the current density over the cross section area of conductor yields the current which is the same as Σnυq.

Figure 4:
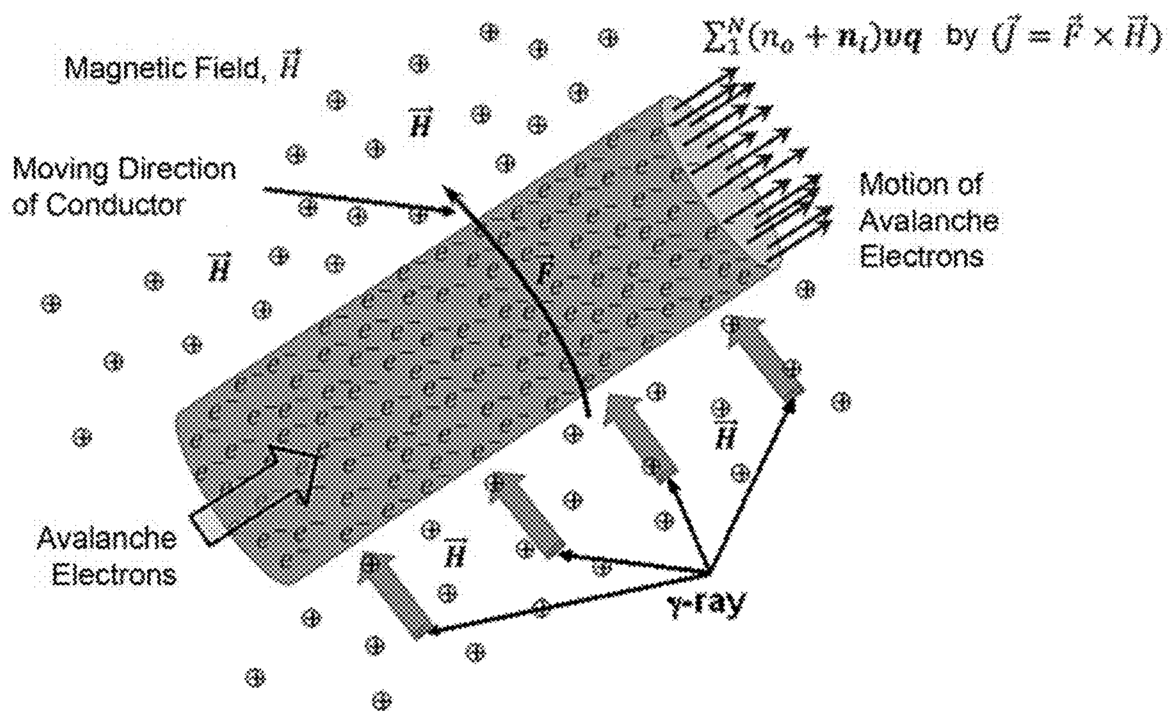
FIG. 4 is a diagram illustrating motion of avalanche electrons in a moving conductor cutting across a magnetic field.

Referring to FIG. 4, in various embodiments, the conducting wires of electric generator are irradiated by high energy photons such as hard x-rays or γ-rays. Through the photon absorption processes described above, this exposure liberates far more free electrons than is ordinarily available for conduction in the valence electrons. FIG. 4 shows the motion of avalanche electrons within a moving conducting wire which runs across the perpendicular magnetic field. Designating the electrons available from unfilled state of atom as no and the avalanche electrons liberated from the intra-bands of atom by high energy photons as $\Sigma_1^N n_i$ where $n_i$ is the number of electrons from intra-bands, i=1, 2, 3, . . . N, then the total electrons available for conduction in a conducting wire is equal to $n_o+\Sigma_1^N n_i$. When a conducting wire under the influence of high energy photons cuts across the perpendicularly oriented magnetic field, these avalanche electrons, $n_o+\Sigma_1^N n_i$, are affected by $\vec{F}\times\vec{H}$ and run through the conductor as an electric current. As a result, the power enhancement can be estimated by the ratio of $$\sum_1^N n_i / n_o$$

for the same number of rotor coils and rotor rotation rate.

As a result, for the same number of coils of conductors in the rotor and the same rotation rate of the rotor, the electrical power output by the electric generator of various embodiments may be boosted over the power of a conventional electric generator by the ratio of $$\sum_1^N n_i / n_o.$$

This increase in electrical power output of the electric generator of various embodiments will require a commensurate increase in the mechanical force applied to turn the rotor at the same rotation rate. Alternatively, the same amount of electrical power as output by a conventional electric generator may be produced by an electric generator of various embodiments with a rotation rate that is slower by a factor of about $n_o/\Sigma_1^N n_i$. As further alternative, the same amount of electrical power as output by a conventional electric generator may be produced by an electric generator of various embodiments with the same rotation rate but with a rotor having approximately $n_o/\Sigma_1^N n_i$ fewer (i.e., smaller and lighter) conductors.

Figure 5:
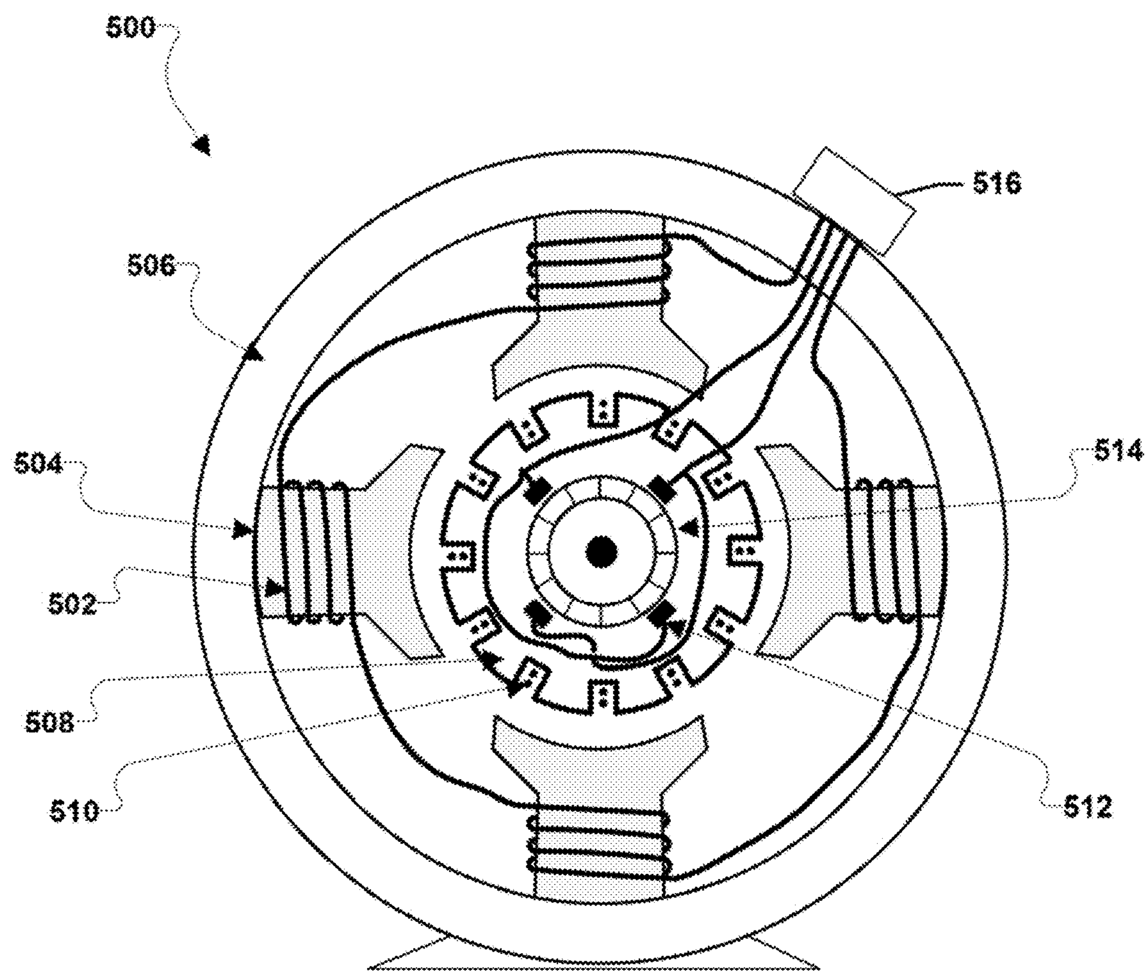
FIG. 5 is a cross-sectional view of a conventional electric generator.

A notional design of an electric generator 500 is illustrated in FIG. 5. In this illustration, a magnetic field is generated by via field windings 502 on the pole pieces 504, which are held in place by a stator yoke 506. The rotor or armature 508 includes armature conductors 510 oriented perpendicular to the magnetic field emanating from the poles 504. Brushes 512 contacting a commutator 514 on the armature 508 or rotor pick up electric current generated in the armature conductors 510. A terminal box 516 receives current from the armature conductors and directs a portion of the current through the field windings 502.

Figure 6:
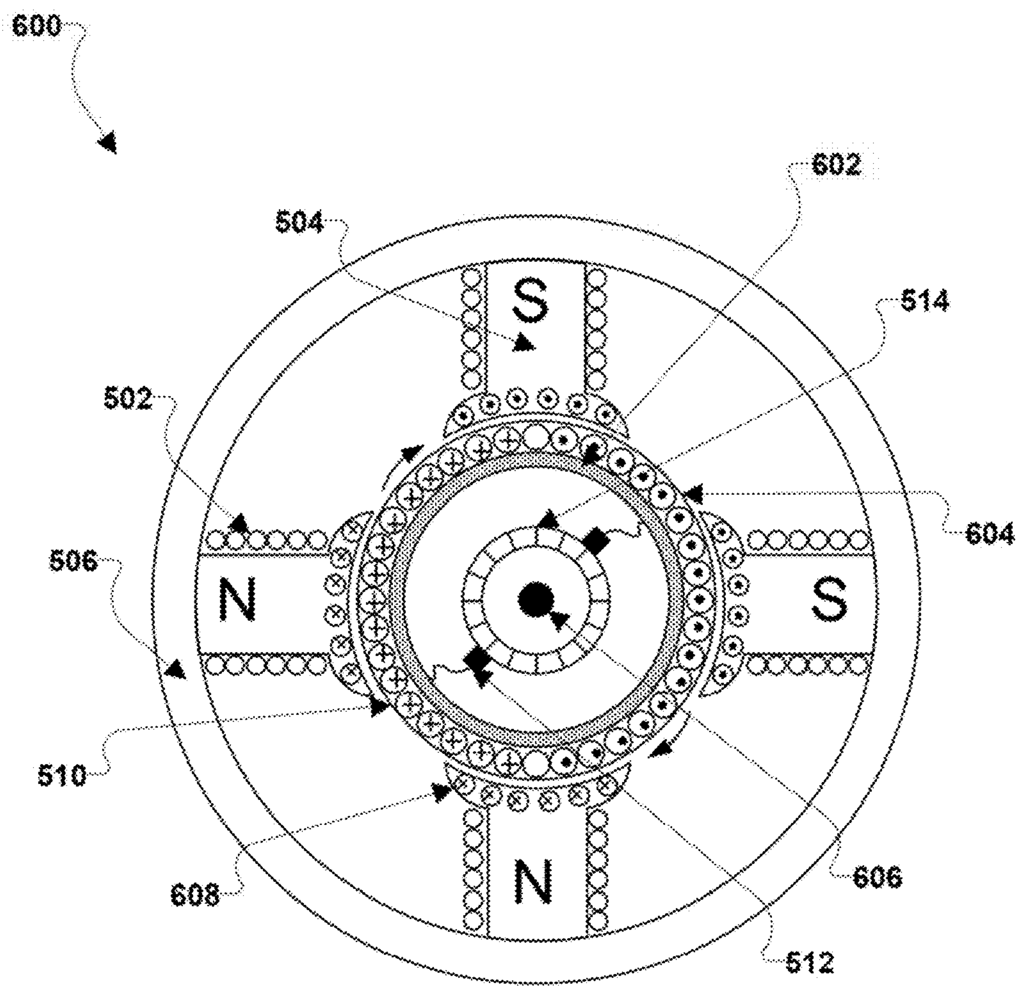
FIG. 6 is a cross-sectional view of an electric generator according to an embodiment.

FIG. 6 illustrates a first embodiment of an electric generator 600 that includes a high energy photon source 602 within the armature core 604 inside of the armature windings 510. The armature core 604 may be supported on a rotor shaft 606. Gamma radiation from the high energy photon source 602 irradiates the armature windings 510 that are positioned in close proximity. Photons not absorbed in the armature windings may be absorbed in windings on the poles 504, including compensating windings 608 and field windings 502.

In some embodiments, the high energy photon source 602 may be a structure that includes or contains a radionuclide such as cobalt-60 ($^{60}$Co) or cesium-137 ($^{137}$Cs) atoms. $^{60}$Co has a half-life of approximately 5.3 years and decays to $^{60}$Ni by beta decay, which promptly emits two gamma rays, one of 1.17 MeV and the other of 1.33 MeV. $^{137}$Cs has a half-life of just over 30 years and decays to barium 137 by beta decay followed by emission of 662 keV gamma ray. The radionuclide may be in the form of a metal, powder, salt, or other chemical composition. As explained more fully below with reference to FIG. 8, the radioactive material may be contained within a can or cladding to prevent release of the radionuclides.

As explained above, absorption of the high energy photons in the conducting wire coils of the armature windings 606 liberates an avalanche of intra-band electrons. When the conducting wires move across the magnetic field emanating from the poles, these large number of electrons, $n_o+\Sigma_1^N n_i$, move collectively along the wires by the Lorentz force ($\vec{F}\times\vec{H}$). The resulting electric current calculated in Eq. (3) is multiplied many times over for the same armature/rotor rate of rotation due to the extra free electrons due to the avalanche of ejected intra-band electrons.

Various embodiments provide two benefits over conventional electric generators. The first benefit appears in the armature coils wound around the rotor/armature. When the armature coils are directly exposed to the γ-ray photons, the photons produce a huge number of mobile electrons available for current, greatly increasing the number of mobile electrons moving through the applied magnetic field. The second benefit arises from the coils on the poles, known as the field and compensating windings. The field and compensating windings are irradiated by the γ-ray photons that are not absorbed by the armature windings. Absorption of those γ-ray photons increases the quantity of mobile electrons in the field and compensating windings, thereby increasing magnetic induction in those coils as well. When the field strength ($\vec{H}$) is increased by magnetic induction in the field and compensating windings, the current density in the armature windings is also increased by $\vec{F}\times\vec{H}$.

In the embodiment illustrated in FIG. 6, the high energy photon source 602 is positioned inside of the magnetic circuit between the armature windings 510 and the poles 504 and field windings 502 and compensating windings 608. Consequently, the effect of the radionuclide and canning materials on the magnetic fields may be minimal. However, in some embodiments, the radionuclide and/or canning materials may be selected to so as to enhance the magnetic circuit between the armature windings 510 and the poles 504 and field windings 502 and compensating windings 608, such as by providing a ferromagnetic backplane to the armature windings 510.

Figure 7:
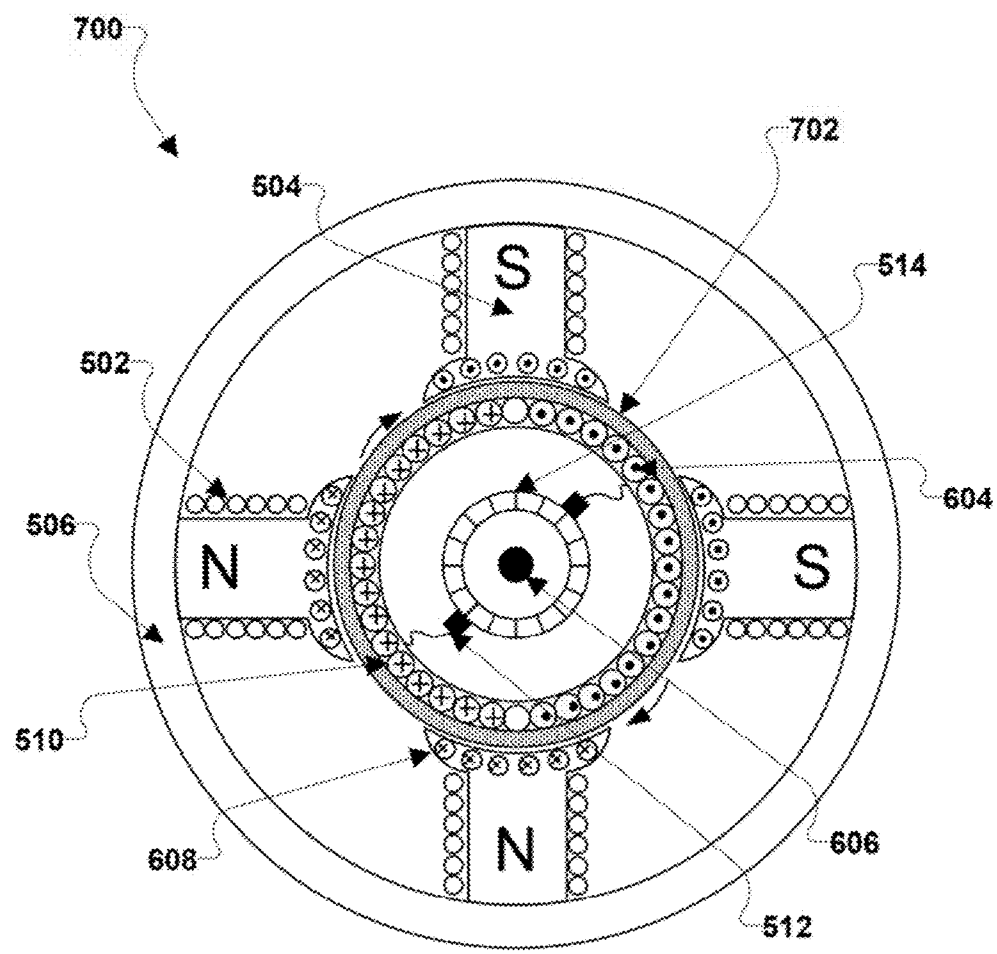
FIG. 7 is a cross-sectional view of an electric generator according to another embodiment.

FIG. 7 illustrates a second embodiment of an electric generator 700 that includes a high energy photon source 702 positioned between the armature 604 and the poles 504. Gamma radiation from the high energy photon source 702 irradiates the armature windings 510 and the windings on the poles, including the field and compensating windings 608 and field windings 502. Thus, the γ-ray photons from the high energy photon source 702 can liberate an abundant number of electrons in the armature windings 510, the compensating windings 608 and the field windings 502 due to the avalanche of electrons produce by the absorption of the γ-ray photons in conductor atoms. The eventual increase in electric power output from the electric generators comes from the increase in current density in the conducting coils of rotor and stator.

In the embodiment illustrated in FIG. 7, the high energy photon source 702 is positioned in the middle of the magnetic circuit between the armature windings 606 and the poles 504, and the field windings 502 and compensating windings 608. Consequently, the radionuclide and canning materials may have an effect on the magnetic fields that drive current through the armature windings. Therefore, in such embodiments, the radionuclide and/or canning materials may be selected to have minimal effect on the magnetic circuit between the armature windings 510 and the poles 504, and the field windings 502 and compensating windings 608. For example, the radionuclide may be an oxide or salt such as CoO, $Co_3O_4$, $CoF_3$, $CoS_2$, $Co_2S_3$, $CoCl_2$, $CoBr_2$, or $CoI_2$. Similarly, the cladding used to contain the radionuclide may be a nonferrous material. Further, the thickness of the high energy photon source 702 may be minimized to reduce the gap between the armature windings 510 and the poles 504 and the field windings 502 and compensating windings 608.

Figure 8:
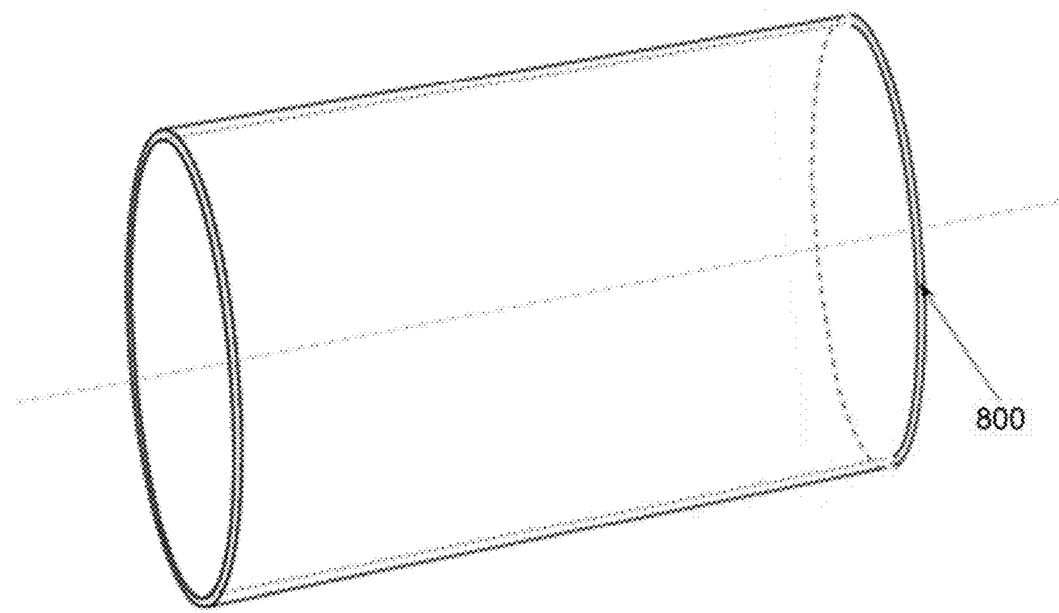
FIG. 8 is a perspective view of cylindrical gamma ray source for inclusion in an electric generator according to some embodiments.

FIG. 8 shows an embodiment of a high energy photon source 800 that may be included in an electric generator according either of the embodiments illustrated in FIGS. 6 and 7. In this embodiment, the high energy photon source 800 is configured as a sleeve structure containing the γ-ray source that can slide into the rotor/armature below the rotor coils as illustrated in FIG. 6 or in the gap between the armature windings 510 and the poles 504 and the field windings 502 and compensating windings 608 as illustrated in FIG. 7.

In order to minimize the potential for release of radioactive materials, as well as to facilitate assembly of the electric generator, the high energy photon source 800 structure may enclose the radionuclide (e.g., $^{60}$Co or $^{137}$Cs) within a cladding or can. Such cladding or can may metal foil or thin plate, such as titanium, aluminum, steel, stainless steel, etc. As noted above, the metal or metal alloy used as a cladding or can structure may be selected for its magnetic properties depending upon whether the high energy photon source 800 is positioned within the rotor/armature below the rotor coils as illustrated in FIG. 6 or in the gap between the armature windings 510 and the poles 504 and the field windings 502 and compensating windings 608 as illustrated in FIG. 7.

Figure 9:
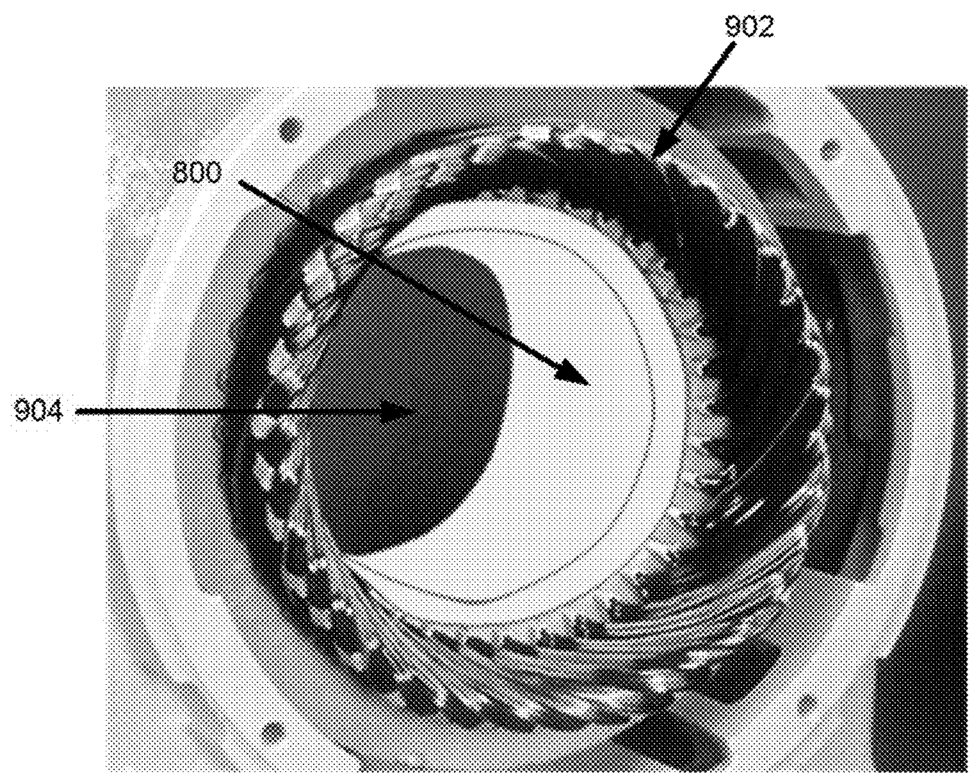
FIG. 9 is an illustrating of a stator portion of an electric generator including a cylindrical gamma ray source according to some embodiments.

FIG. 9 is an image showing the high energy photon source 800 of the embodiment illustrated in FIG. 8 positioned within (e.g., attached to) the inside wall of stator coil winding 902. The hollow space 904 inside the stator coil winding 902 is the space where the rotor/armature is positioned and rotates in an axial symmetry with stator.

While electric generators of various embodiments have been described with reference to notional diagrams of generic electric generators including a stator having poles, pole windings and field and compensating windings, the various embodiments encompass other configurations of electric generators. For example, the stator configuration illustrated in FIG. 9 does not show physical poles as in the diagrams illustrated in FIGS. 5-7. In some embodiments, the electric generator includes fixed permanent magnets in the stator instead of field windings. In some embodiments, the electric generator includes fixed magnets or electromagnets in the rotor and the current generating conductors remain fixed in the stator so that electric current is generated by the magnetic field moving through the conductors as the rotor is rotated. In such embodiments, the high energy photon source may be encompassed anywhere within the current generating conductors of the stator, including on an outside surface. The common feature of various embodiments is the structure of a high energy photon source (e.g., a γ-ray source) configured and positioned within an electric generator so as to irradiate the current generating conductors of the rotor/armature and/or the stator.

Various embodiments include an electric generator having a stator and a rotor, means for generating electric current (e.g., armature windings 606 or stator windings in combination with magnetic field emanating from the rotor) when the rotor is rotated within the stator; and a means for irradiating the means for generating current with high energy photons, such as high energy g-ray photons, as described herein.

Some embodiments include a method of making an electric generator that includes positioning a source of high energy photons (e.g., a γ-ray source) within the electric generator so as to irradiate current generating conductors (e.g., armature windings 606) as described herein.

Various embodiments provide a number of advantages over conventional electric generators. In various embodiments, high energy γ-ray photons emitted from cobalt-60, cesium-137 or another γ-ray source are used to liberate a large number of electrons from the intra-bands of atoms of armature (rotor) winding coils and field/compensating winding coils around the electro-magnet (stator). Various embodiments combine the benefits of avalanche electrons in armature winding coils and field/compensating winding coils, respectively, to enhance the power output of an electric generator running at the same rotation speed anywhere from several times to orders of magnitude as compared to conventional electric generators. Various embodiments require a slight modification to the current form of design for electric generators, such as installing a sleeve of a γ-ray radiation source material within the armature coils or within the gap between the rotor/armature and the stator coils or poles of the stator.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the aspects and/or embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An electric generator, comprising:

a stator and a rotor positioned within the stator, wherein the stator and rotor are configured to generate electric current when the rotor is rotated, wherein the stator generates a magnetic field when the electric generator is operating and the rotor comprises armature windings configured to generate the electric current when the rotor is rotated; and a high energy photon source positioned and configured to irradiate at least a portion of conductors in the rotor or stator.

2. The electric generator of claim 1, wherein the high energy photon source is positioned within the rotor armature windings and configured to irradiate at least the armature windings.

3. The electric generator of claim 2, wherein the high energy photon source is configured as a sleeve that fits within the rotor inside of the armature windings.

4. The electric generator of claim 1, wherein the high energy photon source is positioned between the rotor and the stator and configured to irradiate the armature windings.

5. The electric generator of claim 4, wherein the high energy photon source is configured as a sleeve that fits between the rotor and the stator.

6. The electric generator of claim 1, wherein:

the stator comprises field and compensating windings; and the high energy photon source is positioned and configured to irradiate the field and compensating windings.

7. The electric generator of claim 1, wherein the high energy photon source comprises cobalt-60.

8. The electric generator of claim 1, wherein the high energy photon source comprises cesium-137.

9. The electric generator of claim 1, wherein:

the high energy photon source is positioned within the rotor armature windings and configured to irradiate at least the armature windings;

the high energy photon source is positioned between the rotor and the stator and configured to irradiate at least the armature windings; or the stator comprises field and compensating windings, and the high energy photon source is positioned and configured to irradiate the field and compensating windings.

* * * * *